US009149876B2

(12) United States Patent
Nordgren (10) Patent No.: US 9,149,876 B2
(45) Date of Patent: Oct. 6, 2015

(54) CORE DRILLING MACHINE AND A HANDLE ASSEMBLY FOR A CORE DRILLING MACHINE

(75) Inventor: Klas Nordgren, Gothenburg (SE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 13/641,684

(22) PCT Filed: Apr. 16, 2010

(86) PCT No.: PCT/SE2010/050411
§ 371 (c)(1),
(2), (4) Date: Mar. 4, 2013

(87) PCT Pub. No.: WO2011/129731
PCT Pub. Date: Oct. 20, 2011

(65) Prior Publication Data
US 2013/0195570 A1    Aug. 1, 2013

(51) Int. Cl.
*B23B 45/00* (2006.01)
*B23Q 11/00* (2006.01)
*B25F 5/00* (2006.01)
*B25F 5/02* (2006.01)
*B28D 1/14* (2006.01)
*B23Q 11/10* (2006.01)

(52) U.S. Cl.
CPC .......... *B23B 45/001* (2013.01); *B23Q 11/1092* (2013.01); *B25F 5/008* (2013.01); *B25F 5/026* (2013.01); *B28D 1/14* (2013.01); *Y10T 408/44* (2015.01); *Y10T 408/96* (2015.01)

(58) Field of Classification Search
CPC ....... B23B 45/001; B25F 5/008; B25F 5/026; B28D 1/14; B23Q 11/1092; Y10T 408/44; Y10T 408/96

USPC ............ 408/56, 241 R; 173/170; 16/426, 900
See application file for complete search history.

(56) References Cited

U.S. PATENT DOCUMENTS

| 2,151,673 | A | * | 3/1939 | Acker ........................... 173/148 |
| 2,288,541 | A | * | 6/1942 | Paget ................................. 173/3 |
| 2,545,659 | A | * | 3/1951 | Ginter ............................. 16/426 |
| 3,190,046 | A | * | 6/1965 | Bryant .......................... 451/374 |
| 3,847,229 | A | * | 11/1974 | Wanner et al. .................. 173/48 |

(Continued)

FOREIGN PATENT DOCUMENTS

| DE | 19647575 A1 | 11/1997 |
| DE | 102008000158 A1 | 7/2009 |

(Continued)

OTHER PUBLICATIONS

International Search Report for International Application No. PCT/SE2010/050411, dated Dec. 23, 2010, 5 pages.

(Continued)

*Primary Examiner* — Eric A Gates
(74) *Attorney, Agent, or Firm* — Nelson Mullins Riley & Scarborough LLP (57) ABSTRACT

The present invention relates to a core drilling machine (100). The core drilling machine (100) includes a front housing part (102) including a protruding nose. The drilling machine (100) includes a front handle assembly (118) and an output drive shaft (110) projecting outward from the protruding nose. A fluid attachment ring (120) is rotably arranged around the protruding nose. Further, the front handle assembly (118) is arranged around the protruding nose.

17 Claims, 4 Drawing Sheets

(56) References Cited

U.S. PATENT DOCUMENTS

| | | | | |
|---|---|---|---|---|
| 3,876,014 | A | * | 4/1975 | Moores, Jr. .................. 173/47 |
| 4,276,675 | A | | 7/1981 | Pioch |
| 4,281,722 | A | * | 8/1981 | Tucker et al. .................. 175/57 |
| 4,368,556 | A | * | 1/1983 | Wanner et al. .................. 16/436 |
| 4,625,813 | A | * | 12/1986 | Trivedi et al. .................. 175/20 |
| 4,881,294 | A | * | 11/1989 | Riedl .................. 16/426 |
| 4,962,787 | A | * | 10/1990 | Mayhew .................. 137/556.3 |
| 5,129,467 | A | * | 7/1992 | Watanabe et al. .................. 173/75 |
| 5,690,451 | A | * | 11/1997 | Thurler et al. .................. 408/113 |
| 5,769,174 | A | * | 6/1998 | Lee et al. .................. 173/162.2 |
| 5,888,031 | A | * | 3/1999 | Buck et al. .................. 408/56 |
| 6,799,643 | B2 | * | 10/2004 | Voulkidis et al. .................. 173/170 |
| 7,144,206 | B2 | * | 12/2006 | Burger et al. .................. 408/14 |
| 7,726,417 | B2 | | 6/2010 | Larsson .................. 175/207 |
| 8,037,948 | B2 | * | 10/2011 | Albinsson et al. .................. 173/216 |
| 8,813,868 | B2 | * | 8/2014 | Limberg et al. .................. 173/170 |
| 2005/0087353 | A1 | * | 4/2005 | Oki et al. .................. 173/162.2 |
| 2005/0217440 | A1 | * | 10/2005 | Koschel et al. .................. 81/490 |
| 2005/0249564 | A1 | * | 11/2005 | Van Bergen et al. .................. 408/241 R |
| 2008/0179105 | A1 | * | 7/2008 | Duncan .................. 175/420.1 |
| 2014/0352114 | A1 | * | 12/2014 | Yoshikane et al. .................. 16/426 |

FOREIGN PATENT DOCUMENTS

| | | | | | |
|---|---|---|---|---|---|
| EP | 2292385 | A2 | * | 3/2011 | |
| GB | 2165480 | A | | 4/1986 | |
| GB | 2187664 | A | | 9/1987 | |
| GB | 2383289 | A | | 6/2003 | |
| GB | 2455609 | A | | 6/2009 | |
| JP | 05042404 | A | * | 2/1993 | ............ B23B 31/107 |
| JP | 05309510 | A | * | 11/1993 | .............. B23B 47/00 |
| JP | 2000000784 | A | * | 1/2000 | ................ B25F 5/02 |
| JP | 2001088059 | A | * | 4/2001 | ................ B25F 5/02 |
| JP | 2001300868 | A | * | 10/2001 | ................ B25G 3/24 |
| JP | 2002205285 | A | * | 7/2002 | ................ B25F 5/02 |
| JP | 2002355739 | A | * | 12/2002 | ............ B23Q 17/24 |
| WO | 2011129731 | A1 | | 10/2011 | |

OTHER PUBLICATIONS

International Preliminary Report on Patentability for International Application No. PCT/SE2010/050411, dated Jul. 2, 2012, 4 pages.

* cited by examiner

CORE DRILLING MACHINE AND A HANDLE ASSEMBLY FOR A CORE DRILLING MACHINE

CROSS-REFERENCE TO RELATED APPLICATIONS

This application is a national stage entry of PCT/SE2010/050411, which was filed on Apr. 16, 2010, said application is expressly incorporated herein its entirety.

TECHNICAL FIELD

The present invention relates to a core drilling machine comprising:
a front housing part comprising a protruding nose;
a front handle assembly;
an output drive shaft projecting outward from the protruding nose;
a detachable drill bit tool fastened to the output drive shaft; and
a fluid attachment ring rotatably arranged around the protruding nose

BACKGROUND

Core drilling machines are widely used in order to make holes in bricks, concrete or the like. The core drilling machines may find applications in walls, roofs, floors and rocks also. The core drilling machine includes a drive shaft which is configured to hold a required drill bit tool based on applications. Further, a wet cooling arrangement can be provided to regularly lubricate the drill bit tool by water and/or lubricant. The cooling arrangement can include a water tube connected to a fluid attachment ring which is provided around the drive shaft. DE 19647575 has this, and further a fixed front handle near the rear handle. This however provides an unfavourably short distance between the front and rear handle, a distinct disadvantage.

Normally, a core drilling machine without a water lubricating arrangement is provided with handles at front and rear sections to aid manual gripping by an operator. The front handle assembly at the front section is provided to support the core drilling machine during operation. However, the front handle assembly is often fixed and may provide a hindrance to the operator to maneuver the core drilling machine, while operating. This may lead to other ergonomic problems such as inconveniency in work while changing an inclination of the core drilling from one angle to another angle. Thus, a fixed front handle assembly may pose problems for the operator to work with a core drilling machine.

Hence, there is a need for an improved front handle assembly for a core drilling machine, which provides a better handling of the core drilling machine without interfering with a cooling arrangement.

BRIEF DISCLOSURE OF THE INVENTION

In light of the aforementioned, it is an objective to solve or at least reduce the problem discussed above. In particular, the objective is to provide an improved front handle assembly for a core drilling machine.

The objective is achieved with a novel core drilling machine according to claim 1. The core drilling machine includes a front housing part. Further, the first housing part includes a protruding nose. The drilling device further includes a front handle assembly and an output drive shaft. The output drive shaft is projected outwards from the protruding nose of the front housing part. Further, the drilling device includes a detachable drill bit tool, which is fastened to the output drive shaft. The drilling device also includes a fluid attachment ring which is rotatably arranged around the protruding nose. In an aspect of the present invention, a front handle assembly is arranged around the protruding nose, and is preferably rotatably arranged. Therefore the front handle assembly may relatively rotate about the fluid attachment ring to allow easy maneuvering of the core drilling machine. The advantage of a fluid attachment is combined with a front handle placed far forward being rotably adjustable in relation to the fluid supply.

According to claim 2, the front handle assembly further includes a front handle and a front handle support. Further, according to claim 3, the front handle includes a hand grip and a handle screw. The handle screw protrudes from an inner end of the hand grip and is rotatably fixed to the hand grip. In an aspect of the present invention, the handle screw may be screwed into a thread provided in the front handle support. The front handle may be tightened in the thread to attach and may be loosed to detach the front handle from the front handle support.

According to claim 4, an inner end of the handle screw when screwed by the hand grip is arranged t6 come into contact with the fluid attachment ring via a multiple protective bodies. The front handle may be locked with the fluid attachment ring and the protruding nose.

According to claim 5, the front handle support also includes a front ring section. Further, the front ring section is located in front of the fluid attachment ring. Further, according to claim 6, the front handle support includes a rear ring section such that, the rear ring section is located behind the fluid attachment ring.

According to claim 7, the front handle support and the rear ring section are in contact to provide radial support for the front handle support. According to claim 8, the rear ring section also includes an aperture. According to claim 9, the front handle support includes a protruding section. Further, the protruding section may extend through the aperture of the rear ring section.

According to claim 10, the front housing part is connected to a rear housing part via an intermediate housing part.

According to claim 11, the detachable drill bit tool may include at least one cutting edge comprising diamonds.

According to claim 12, the core drilling machine is a concrete drilling machine.

Claim 13 describes a front handle assembly for the core drilling machine. The front handle assembly may include a front handle support and a front handle connected with the front handle support. The front handle assembly further includes a front ring section. The front ring section is radially holding a front end of the front handle support. The front handle assembly also includes a rear ring section. The rear ring section is provided in contact with a rear end of the front handle support. In an aspect of the present invention, the front handle support and the rear ring section are in contact to create radial support for the front handle support.

According to claim 14, the rear ring section may include an aperture. Further, according to claim 15, the front handle support may include a protruding section. The protruding section may extend through the aperture of the rear ring section.

BRIEF DESCRIPTION OF THE DRAWINGS

The invention will in the following be described in more detail with reference to the enclosed drawings, wherein.

DESCRIPTION OF EMBODIMENTS

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of devices. In the drawings, like numbers refer to like elements.

Figure 1:
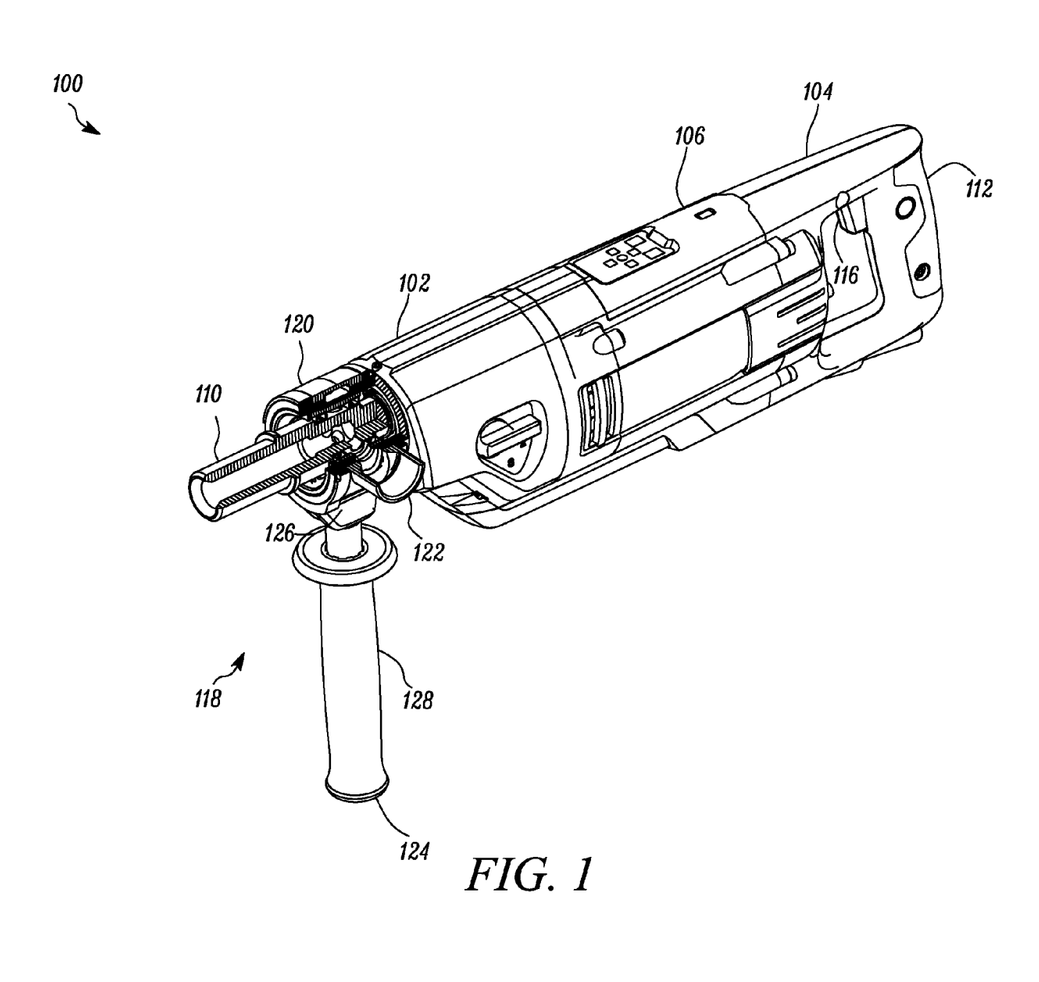
FIG. 1 illustrates a perspective view of a core drilling machine, in accordance with an embodiment of the present invention.

FIG. 1 shows a perspective view of an exemplary core drilling machine 100, in accordance with an embodiment of the present invention. In an embodiment of the present invention, the core drilling machine 100 may be used in concrete drilling application. However, it should be understood that the present invention could be incorporated into any suitable type of hand-held machine, for example, but not limited to, rotary cutter, handheld drill hammers etc. and is not limited to use merely in concrete drilling. In addition, any suitable size, shape or type of elements or materials could be used.

The core drilling machine 100, as shown in the FIG. 1, includes a housing which may be structured into multiple parts. In an embodiment of the present invention, the housing may include a front housing part 102 and a rear housing part 104. In another embodiment of the present invention, the front housing part 102 is connected to the rear housing part 104 via an intermediate housing part 106. The intermediate housing part 106 may include an input means to set and control the torque and/or speed of the core drilling machine 100. Further, it may be apparent to a person skilled in art, that the core drilling machine 100 may include a single integral housing.

Figure 2:
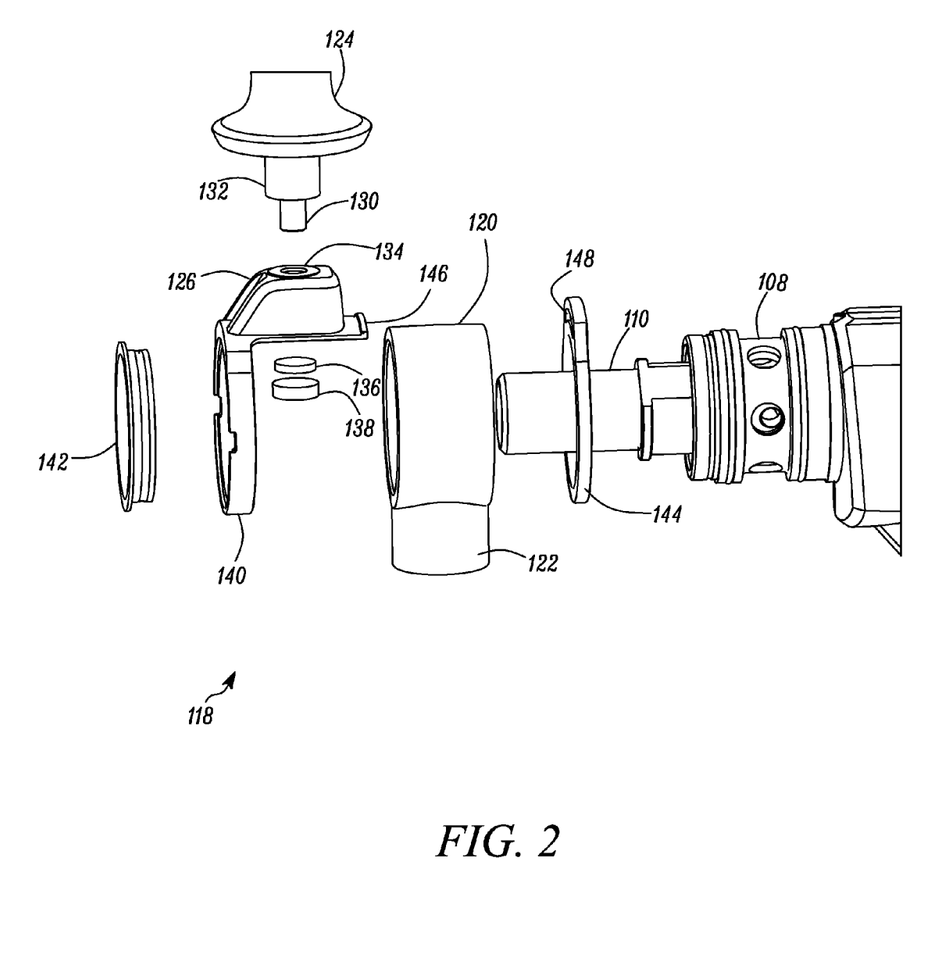
FIG. 2 illustrates an exploded view of a front handle assembly for the core drilling machine, in accordance with an embodiment of the present invention.

In an embodiment of the present invention, the front housing part 102 may include a protruding nose 108 (shown in FIG. 2). The protruding nose 108 may extend in a forward direction of the front housing part 102. The rear housing part 104 may include a prime mover (not shown) such as, but not limned to, an electric motor for driving the core drilling machine 100. In an embodiment of the present invention, the electric motor may be drivably connected to an output drive shaft 110 via a suitable transmission assembly such as, but not limited to, gear, belts or a combination of these. The output drive shaft 110 may project outward from the protruding nose 108 and a detachable drill bit tool (not shown) may fasten to the output drive shaft 110. In various embodiments of the present invention, the output drive shaft 110 may be made of spring steel so that it can be flexed while drilling without breaking. However, the output drive shaft 110 may be made of any other material, for example, but not limited to, hardened steel.

The rear housing part 104 may include a rear handle 112 to assist manual gripping of the core drilling machine 100 during operation. The front housing part 102 of the core drilling machine 100 may include a torque/speed regulator 114. The rear handle 112 may also have a pulse trigger 116 to start and stop the operation of the core drilling machine 100. Further, the core drilling machine 100 may include a front handle assembly 118 and a fluid attachment ring 120. In an embodiment of the present invention, the front handle assembly 118 and the fluid attachment ring 120 may be both rotatably arranged around the protruding nose 108.

In various embodiments of the present invention, the drill bit tool may include a diamond cutter and a cutting tool with a plurality of cutting edges. During operation, in order to cool the drill bit tool and the output drive shaft 110, the fluid attachment ring 120 may be connected to a coolant tube (not shown) via a hose connector 122. The hose connector 122 may be integrally provided with the fluid attachment ring 120. The coolant tube may supply water and/or lubricant to cool the output drive shaft 110 and the drill bit tool during operation. The connector 122 can alternatively connect an adaptor for a vacuum cleaner to suck away dust.

In an embodiment of the present invention, the front handle assembly 118 may include a front handle 124 and a front handle support 126. Further, the front handle 124 may include a hand grip 128 to assist a tight griping of the core drilling machine 100 in addition to the rear handle 112. Further, a press fit arrangement of the front handle assembly 118 secured with the front housing part 102.

FIG. 2 illustrates an exploded view of the front handle assembly 118 of the core drilling machine 100. As shown in FIG. 2, the front handle 124 includes a handle screw 130 and a spacer 132, such that the handle screw 130 is rotatably fixed to the hand grip 128 and protrudes from an inner end of the hand grip 128. Corresponding to the handle screw 130, a thread 134 is provided in the front handle support 126. During assembly, the thread 134 may receive the handle screw 130 by rotating the front handle 124 and may detach by loosing the handle screw 130. Further, in an assembled state, the handle screw 130 comes in contact with the fluid attachment ring 120 preferably via multiple protective bodies 136 and 138. A spring 162, e,g, of steel or an elastomeric material, e,g, rubber, in the front handle 124 is compressed by the spacer 132 when the hand grip 128 is screwed via handle screw 130 such that protective bodies 136 and 138 are pressed harder and harder towards the fluid attachment ring 120 when the handgrip is screwed more and more. This provides a very stiff attachment of the handgrip 128. In an embodiment of the present invention, the protective bodies 136 and 138 may be made of an elastomeric material (e.g. rubber), steel or plastic. When screwing the handgrip 128 both the front handle and the fluid attachment ring 120 are locked not to rotate around the protruding nose 108. They are therefore also locked in relation to eachother, and in a selected position. This is very favorable for the operator.

In an embodiment of the present invention, the front handle support 126 may include a front ring section 140. The front ring section 140 may be located in front of the fluid attachment ring 120. The front ring section 140 may be an integral part of the front handle support 126 and in the assembled state, the front ring section 140 radially holds the front handle support 126. Further, the front ring section 140 may be configured to receive a lock ring 142 into the front ring section 140. In an embodiment of the present invention, the lock ring 142 may also be made of some lighter material such as plastic.

In an embodiment of the present invention, the front handle support 126 may include a rear ring section 144, such that the rear ring section 144 is located behind the fluid attachment ring 120. Further, the front handle support 126 includes a protruding section 146 which is configure to be received in an aperture 148 provided in the rear ring section 144.

Figure 3:
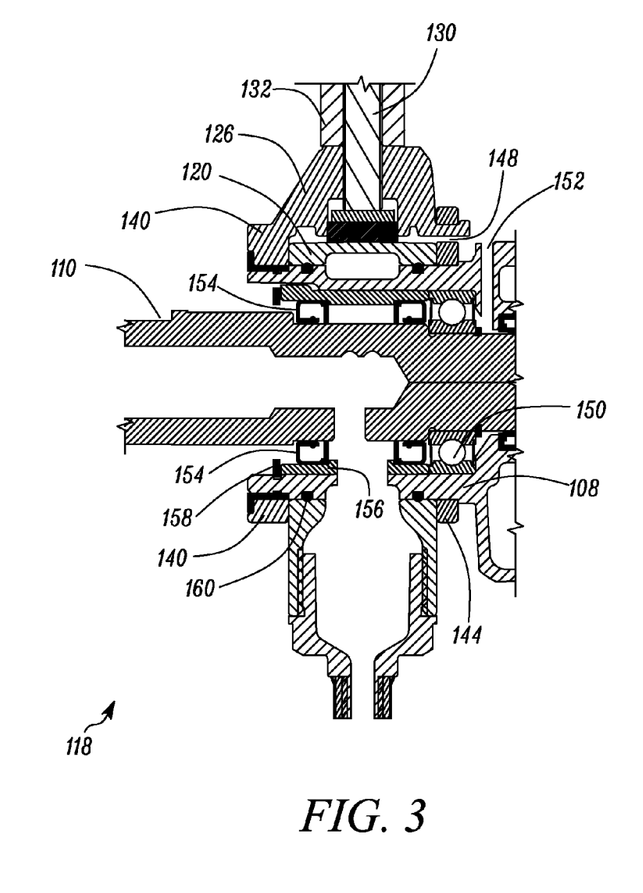
FIG. 3 illustrates a cross-sectional view of the front handle assembly for the core drilling machine, in accordance with an embodiment of the present invention.

FIG. 3 shows a cross-sectional view of the front handle assembly 118, in accordance with an embodiment of the present invention. As shown in the FIG. 3, in an embodiment of the present invention, the output drive shaft 110 may be supported on a bearing 150. During operation, the bearing 150 may reduce wear of the output drive shaft 110. Further, a leak indicating passage 152 is provided to indicate a water leak in the sealing 154 during operation.

Moreover, multiple sealing members 154 are provided between the output drive shaft 110 and a sleeve 156. The sealing members 154 may provide a leak proof passage for the coolant within the output drive shaft 110. The sleeve 156 may also include a protruding part, such that the protruding part is received in a groove provided on the protruding nose 108.

Additionally, a circular clip 158 also supports the sleeve 156. Further an 0-rings 160 is disposed between the fluid attachment ring 120 and the protruding nose 108. The O-rings 160 may be a compressed seal, between the fluid attachment ring 120 and the protruding nose 108. However, any other sealing means (e.g. face seal, lip seal etc.) may be utilized without departing from the essence of the present invention.

Figure 4:
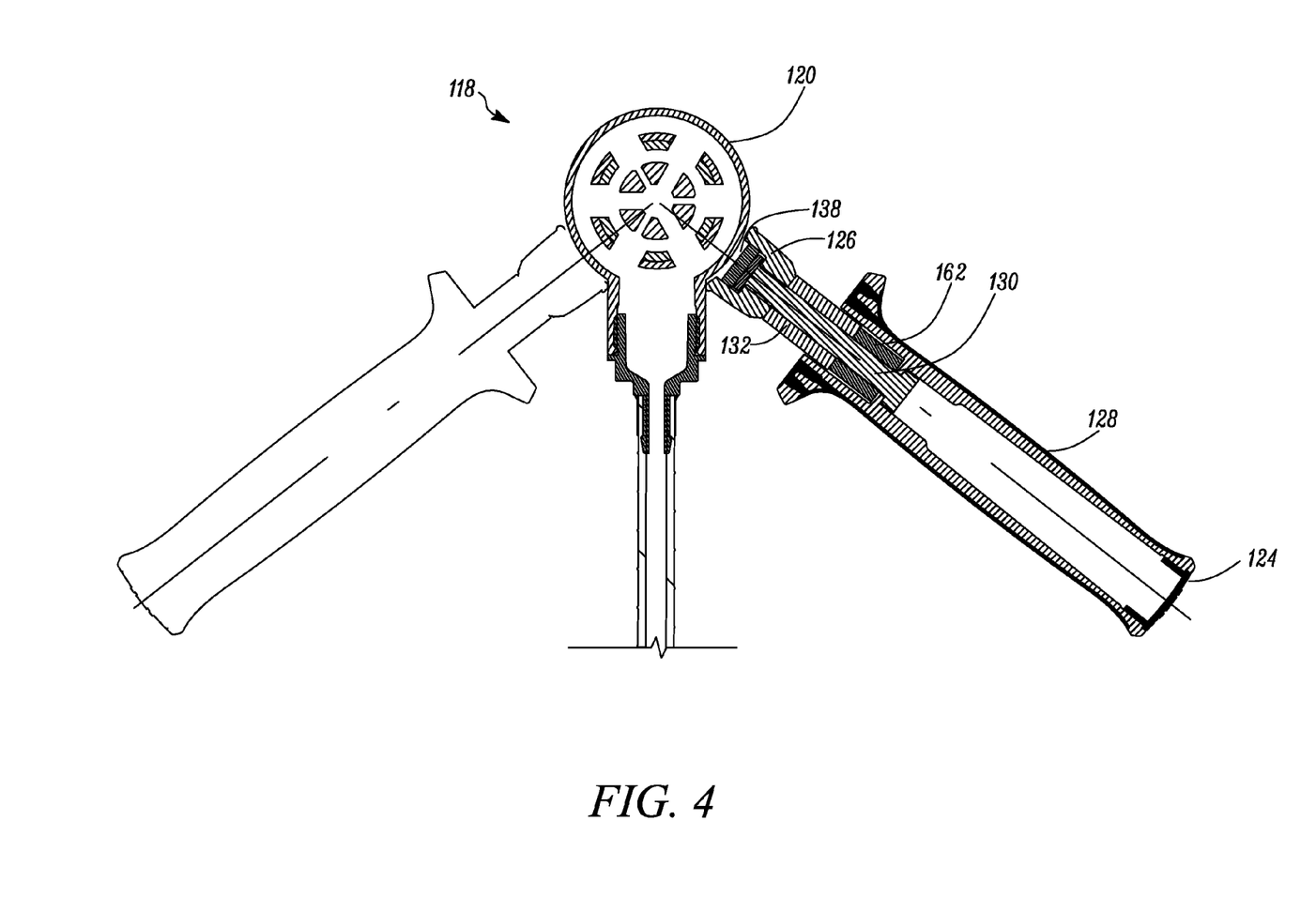
FIG. 4 illustrates another cross-sectional view of the front handle assembly for the core drilling machine, in accordance with an embodiment of the present invention.

FIG. 4 shows another cross-sectional view of the front handle assembly 118, in accordance to the present invention. The front handle 118 is rotatable around the fluid attachment ring 120 when required. In an embodiment of the present invention, the rotation of the front handle 118 may be provided with an orientation of about 256 degrees around the fluid attachment ring 120. This limited orientation of front handle 118 may permit rotation of the front handle 124 around the fluid attachment ring 120 without interfering with the cooling arrangement. Further, the present invention may advantageously facilitate an improved separate lock for the front handle 124 and the cooling tube (not shown) simultaneously. In addition to that, the present invention may permit a better handling of the core drilling machine 100 and may also allow the operator to improve the work efficiency.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A core drilling machine, the core drilling machine comprising:
 a front housing part comprising a protruding nose;
 a front handle assembly comprising a front handle and a front handle support, wherein the front handle assembly is rotatably arranged around a fluid attachment ring arranged around the protruding nose, wherein the fluid attachment ring and the protruding nose are arranged concentrically to each other;
 an output drive shaft projecting outward from the protruding nose; and
 a detachable drill bit tool fastened to the output drive shaft;
 wherein the front handle comprises a hand grip and a handle screw rotatably fixed to the hand grip and protruding from an inner end of the hand grip, so that the front handle can be screwed into a thread in the front handle support for attachment and be unscrewed for detachment, and an inner end of the handle screw when screwed by the hand grip is arranged to come into contact, directly or indirectly via protective bodies, with the fluid attachment ring for locking of the front handle and the fluid attachment ring for rotation around the protruding nose.

2. The core drilling machine according to claim 1, wherein the front handle support comprises a front ring section, the front ring section is located in front of the fluid attachment ring.

3. The core drilling machine according to claim 1, wherein the front handle support comprises a rear ring section, the rear ring section is located behind the fluid attachment ring.

4. The core drilling machine according to claim 3, wherein the front handle support and the rear ring section are in contact to provide radial support for the front handle support.

5. The core drilling machine according to claim 4, wherein the rear ring section comprises an aperture.

6. The core drilling machine according to claim 5, wherein the front handle support comprises a protruding section, the protruding section extends through the aperture of the rear ring section.

7. The core drilling machine according to claim 1, wherein the front housing part is connected to a rear housing part directly or via an intermediate housing part, the machine having a rear handle.

8. The core drilling machine according to claim 1, wherein the detachable drill bit tool comprises at least one cutting edge comprising diamonds.

9. The core drilling machine according to claim 1, wherein the core drilling machine is a concrete drilling machine.

10. The core drilling machine as recited in claim 1, wherein the front handle assembly and the fluid attachment ring are rotably movable relative to the protruding nose when the core drilling machine is in operation.

11. The core drilling machine as recited in claim 1, wherein the front handle assembly is concentrically arranged around the fluid attachment ring.

12. The core drilling machine as recited in claim 1, further comprising a rear housing part that is opposite to the front housing part, the rear housing part including a rear handle.

13. The core drilling machine as reicted in claim 12, wherein the rear handle is substantially orthgonal to a front handle extending from the front handle assembly.

14. A front handle assembly configured to be rotatably arranged around protruding nose of a core drilling machine, the front handle assembly comprising:
 a front handle support;
 a front handle comprising a hand grip and a handle screw rotatably fixed to the hand grip and protruding from an inner end of the hand grip, the front handle configured to be connected with the front handle support; and
 a fluid attachment ring arranged around the protruding nose, wherein the fluid attachment ring and the protruding nose are arranged concentrically to each other;
 wherein the handle screw has an inner end that is configured to come into contact, directly or indirectly via protective bodies, with the fluid attachment ring for locking of the front handle and the fluid attachment ring for rotation around the protruding nose.

15. The front handle assembly according to claim 14, further comprising:
 a front ring section, the front ring section is radially holding a front end of the front handle support;
 a rear ring section configured to be in contact with a rear end of the front handle support, wherein the front handle support and the rear ring section are in contact to create radial support for the front handle support, and an axial space is arranged between the front ring section and the rear ring section enabling a fluid attachment ring to be located between the front ring section and the rear ring section.

16. The front handle assembly according to claim 15, wherein the rear ring section comprises an aperture.

17. The front handle assembly according to claim 16, wherein the front handle support comprises a protruding section, the protruding section extends through the aperture of the rear ring section.

\* \* \* \* \*

UNITED STATES PATENT AND TRADEMARK OFFICE
CERTIFICATE OF CORRECTION

| | | |
|---|---|---|
| PATENT NO. | : 9,149,876 B2 | |
| APPLICATION NO. | : 13/641684 | |
| DATED | : October 6, 2015 | |
| INVENTOR(S) | : Klas Nordgren | |

It is certified that error appears in the above-identified patent and that said Letters Patent is hereby corrected as shown below:

Title Page, Item (75) "Inventor: Klas Nordgren, Gothenburg (SE)" should read -- Inventor: Klas Nordgren, Goteborg (SE) --.

Signed and Sealed this
Fifth Day of April, 2016

Michelle K. Lee
*Director of the United States Patent and Trademark Office*